(12) United States Patent
Umemura et al.

(10) Patent No.: US 10,658,768 B2
(45) Date of Patent: May 19, 2020

(54) EARTH TERMINAL MOUNTING STRUCTURE

(71) Applicant: Toyota Jidosha Kabushiki Kaisha, Toyota-shi, Aichi-ken (JP)

(72) Inventors: Kenji Umemura, Toyota (JP); Tatsuya Murata, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/257,804

(22) Filed: Jan. 25, 2019

(65) Prior Publication Data

US 2019/0237883 A1 Aug. 1, 2019

(30) Foreign Application Priority Data

Jan. 31, 2018 (JP) ................................. 2018-015361

(51) Int. Cl.
| | | |
|---|---|---|
| *H01R 11/11* | (2006.01) | |
| *H01R 4/64* | (2006.01) | |
| *H01R 4/34* | (2006.01) | |
| *H01R 11/12* | (2006.01) | |
| *H01R 4/30* | (2006.01) | |
| *B60R 16/00* | (2006.01) | |

(52) U.S. Cl.
CPC ............... *H01R 4/64* (2013.01); *B60R 16/00* (2013.01); *H01R 4/305* (2013.01); *H01R 4/34* (2013.01); *H01R 11/12* (2013.01); *H01R 2201/26* (2013.01)

(58) Field of Classification Search
CPC ....................................................... H01R 11/12
USPC ......................................... 439/883, 777, 801
See application file for complete search history.

(56) References Cited

U.S. PATENT DOCUMENTS

| | | | | |
|---|---|---|---|---|
| 4,002,390 A | * | 1/1977 | Perry ..................... | H01R 11/12 439/433 |
| 5,021,013 A | * | 6/1991 | Wiesler ................ | H01R 11/289 439/754 |
| 5,188,544 A | * | 2/1993 | Mukai .................... | H01R 11/12 439/287 |
| 9,502,792 B2 | | 11/2016 | Kim et al. | |
| 9,559,464 B2 | * | 1/2017 | Yang ..................... | H01M 2/305 |

FOREIGN PATENT DOCUMENTS

| | | |
|---|---|---|
| CN | 1188998 A | 7/1998 |
| CN | 206727238 U | 12/2017 |
| JP | 2000208172 A | 7/2000 |

* cited by examiner

*Primary Examiner* — Phuong K Dinh
(74) *Attorney, Agent, or Firm* — Dinsmore & Shohl LLP (57) ABSTRACT

An earth terminal mounting structure includes a boss protruding from a conductive case; and an earth terminal fixed to a distal end surface of the boss. The earth terminal is provided with a terminal-side stopper that extends along a side surface of the boss. A boss-side stopper having a protrusion shape is provided on the side surface of the boss. The boss-side stopper faces the terminal-side stopper in a circumferential direction of the boss. The terminal-side stopper and the boss-side stopper restrict rotation of the earth terminal in a clockwise direction and in a counterclockwise direction.

9 Claims, 9 Drawing Sheets

EARTH TERMINAL MOUNTING STRUCTURE

CROSS-REFERENCE TO RELATED APPLICATIONS

This application claims priority to Japanese Patent Application No. 2018-015361 filed on Jan. 31, 2018, which is incorporated herein by reference in its entirety including the specification, drawings and abstract.

BACKGROUND

1. Technical Field

The disclosure relates to an earth terminal mounting structure in which an earth terminal is fixed to a ease of an electric device.

2. Description of Related Art

There is a case where an earth terminal is connected to a case of an electric device. The earth terminal is fixed with a bolt in many cases. In such a case, a rotation stopper may be provided in order to restrict rotation of the earth terminal. An example of a rotation stopper for an earth terminal is disclosed in Japanese Unexamined Patent Application Publication No. 2000-208172 (JP 2000-208172 A). In the case of a rotation stopping structure in JP 2000-208172 A, a lug extends from an earth terminal and a board provided with a hole that is fitted to the lug is mounted onto an electric device. Rotation of the earth terminal is restricted by fitting the lug into the hole.

SUMMARY

The present disclosure provides a mounting structure in which an earth terminal is mounted onto a case of an electric device, the mounting structure including a rotation stopper that has a structure different from a structure in which a lug is fitted into a hole.

An aspect of the disclosure relates to an earth terminal mounting structure. The earth terminal mounting structure includes a boss protruding from a conductive case; and an earth terminal fixed to a distal end surface of the boss. The earth terminal is provided with a terminal-side stopper that extends along a side surface of the boss. A boss-side stopper having a protrusion shape is provided on the side surface of the boss, the boss-side stopper facing the terminal-side stopper in a circumferential direction of the boss. The terminal-side stopper and the boss-side stopper restrict rotation of the earth terminal in a clockwise direction and in a counter-clockwise direction.

In the earth terminal mounting structure according to the aspect of the disclosure, a board with a hole as in JP 2000-208172 A is not needed. A rotation stopper can be provided simply by providing the earth terminal with the terminal-side stopper and providing the protrusion-shaped stopper (boss-side stopper) on the side surface of the boss of the conductive case. Therefore, the rotation stopper in the earth terminal mounting structure according to the aspect of the disclosure can be provided if there is a set a space (i.e., a narrow space). Therefore, the earth terminal mounting structure is suitable for an electric device that is installed in a narrow space such as a front compartment of a vehicle in which various components, cables, and/or pipes are provided in a complicated manner. Note that, the boss-side stopper may be a thin and long protrusion extending along the side surface of the boss. That is, the boss-side stopper may have a rib shape or a linear protrusion shape.

In the earth terminal mounting structure according to the aspect of the disclosure, the earth terminal may be provided with a first terminal-side stopper and a second terminal-side stopper. A first boss-side stopper that faces the first terminal-side stopper in the circumferential direction of the boss and a second boss-side stopper that faces the second terminal-side stopper in the circumferential direction of the boss may be provided on the side surface of the boss. The first terminal-side stopper and the first boss-side stopper may restrict the rotation of the earth terminal in the clockwise direction. The second terminal-side stopper and the second boss-side stopper may restrict the rotation of the earth terminal in the counter-clockwise direction.

In the earth terminal mounting structure according to the aspect of the disclosure, at least one of a gap between the first terminal-side stopper and the boss and a gap between the second terminal-side stopper and the boss may be secured. With this configuration, since the gap is secured, it becomes easy to mount the earth terminal provided with the terminal-side stopper.

In the earth terminal mounting structure according to the aspect of the disclosure, at least one of a gap between the first terminal-side stopper and the first boss-side stopper and a gap between the second terminal-side stopper and the second boss-side stopper may be secured in the circumferential direction of the boss. With this configuration, since the gap is secured in the circumferential direction of the boss, it becomes easier to mount the earth terminal.

In the earth terminal mounting structure according to the aspect of the disclosure, the case may include a first partial case and a second partial case. In the first partial case, a first boss may be provided at a position adjacent to the second partial case. A first earth terminal may be fixed to a distal end surface of the first boss. In the second partial case, a second boss may be provided at a position adjacent to the first boss. A second earth terminal may be fixed to a distal end surface of the second boss. The terminal-side stopper may be provided on each of the first earth terminal and the second earth terminal. The boss-side stopper may be provided on a side surface of each of the first boss and the second boss. A distance between the first boss and the second boss may be shorter than a length of the first earth terminal. A first cable connected to the first earth terminal and a second cable connected to the second earth terminal may be routed from a second partial case-side to a first partial case-side. The first cable and the second cable may not intersect with each other.

With the above-described configuration, the two earth terminals are connected to the case such that the two earth terminals are adjacent to each other. When one earth terminal rotates, the one earth terminal may interfere with the other earth terminal. However, since the stopper configured to stop rotation is provided for each of the earth terminals and each of the bosses, interference between the two earth terminals can be prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
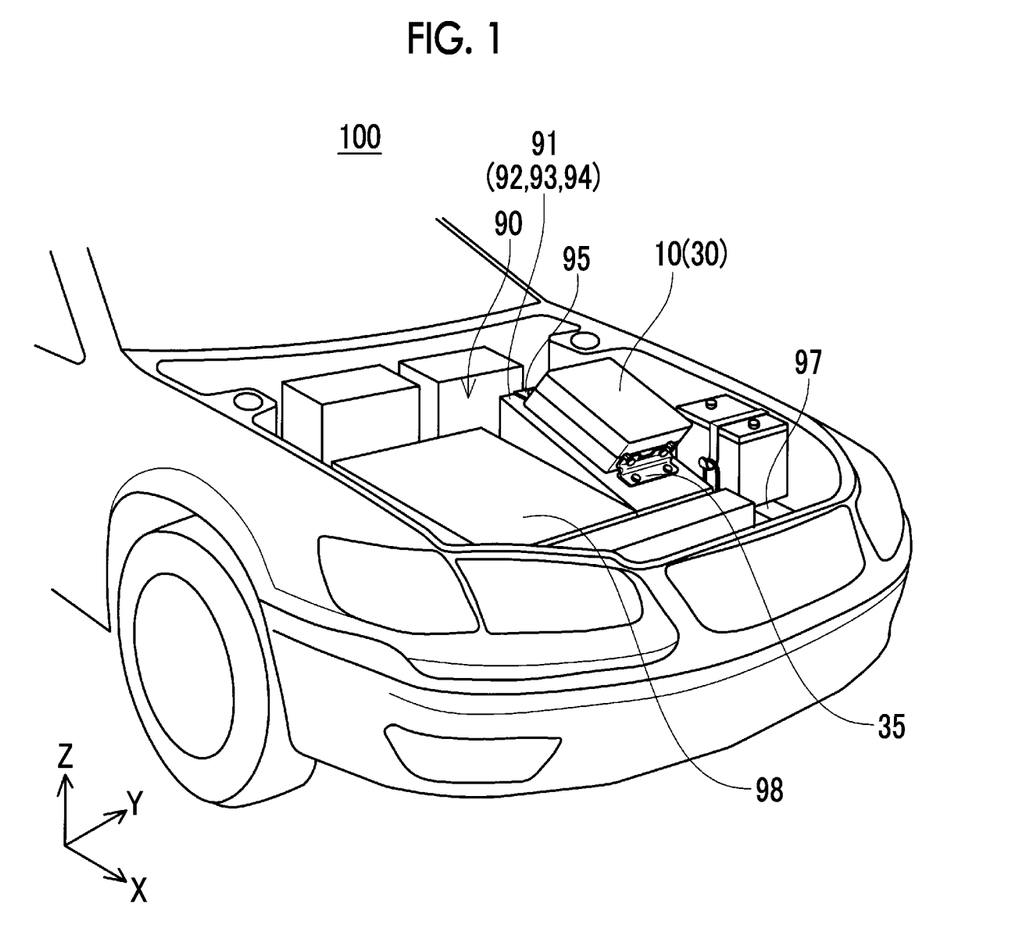
FIG. 1 is a perspective view of a front compartment in which an electric power converter is installed.

A mounting structure of an embodiment will be described with reference to drawings. The mounting structure of the embodiment is applied to an electric power converter 10 installed in a front compartment 90 of a hybrid vehicle 100. FIG. 1 is a perspective view of the front compartment 90 of the hybrid vehicle 100. The hybrid vehicle 100 travels with the use of an engine 98 and a motor 92. The motor 92 is built into a transaxle 91 along with a gear set 93 and a differential gear 94. The engine 98 and the transaxle 91 are connected in a lateral direction of the vehicle. The engine 98 and the transaxle 91 are supported between two side members 97 that extend in a vehicle front-rear direction in a lower portion of the front compartment 90. Note that, in FIG. 1, one of the side members is hidden and cannot be seen.

The coordinate system in FIG. 1 will be described below. A positive direction of an X axis coincides with a direction toward a vehicle front side and a positive direction of a Z axis coincides with a direction toward a vehicle upper side. A positive direction of a Y axis coincides with a direction toward a vehicle left side. In the subsequent drawings, the relationship between the axes and the directions in the vehicle is the same as the relationship described above.

The electric power converter 10 is fixed onto (an upper portion of) the transaxle 91. The electric power converter 10 is a device that converts electric power output from a main battery (not shown) into drive electric power for the motor 92. More specifically, the electric power converter 10 increases the voltage of the electric power output from the main battery and converts the electric power into alternating current power. A voltage converter circuit and an inverter circuit are accommodated in a case of the electric power converter 10.

Figure 2:
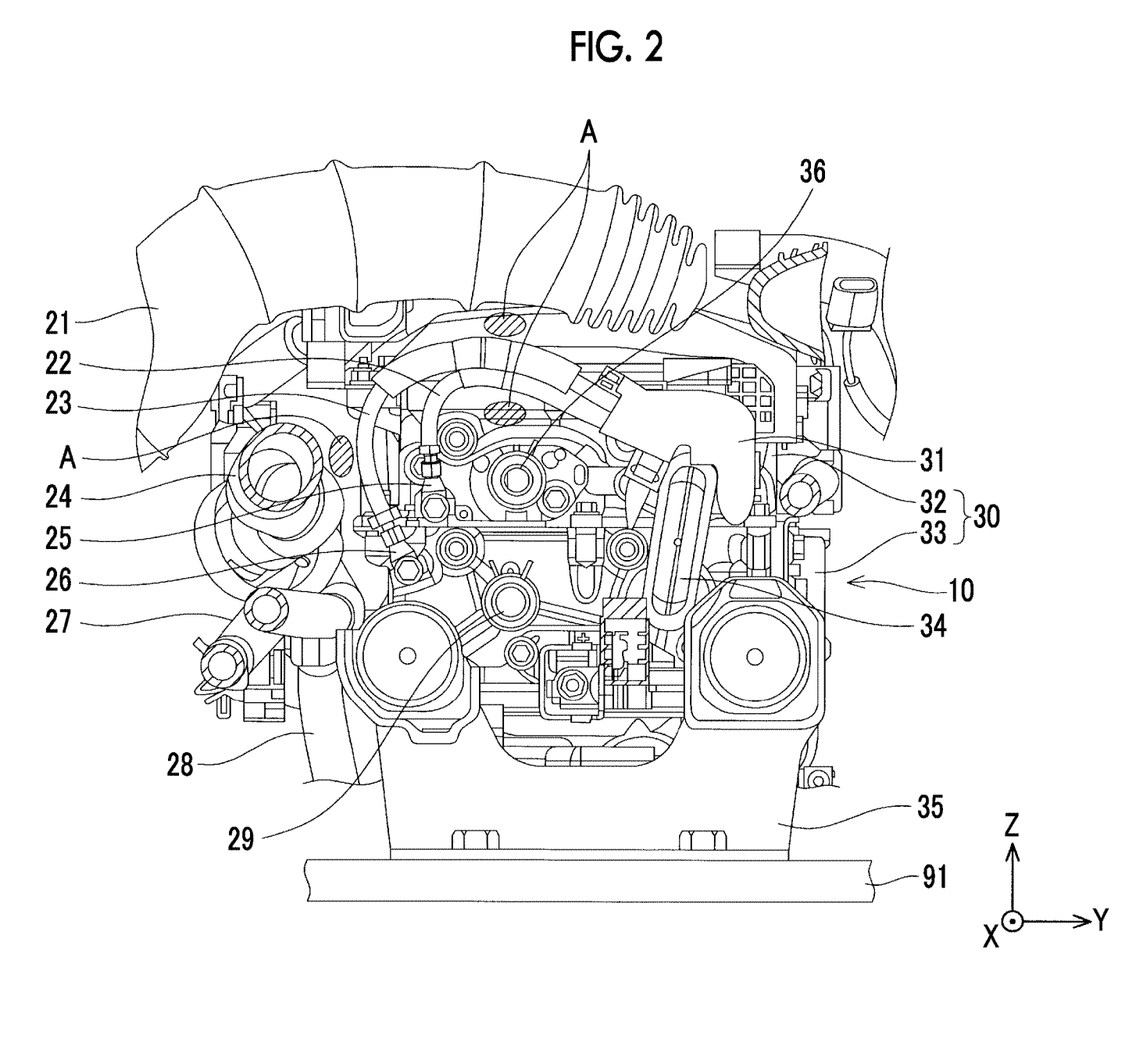
FIG. 2 is a front view of the electric power converter installed in the front compartment.

The electric power converter 10 is fixed onto (an upper portion of) the transaxle 91 with the use of a front bracket 35 and a rear bracket 95. In FIG. 1, a case 30 of the electric power converter 10 is shown in a simplified manner and devices disposed in the vicinity of the electric power converter 10 are not shown. FIG. 2 is a front view illustrating the electric power converter 10 installed in the front compartment 90 and the devices in the vicinity of the electric power converter 10.

The case 30 of the electric power converter 10 is divided into an upper case 32 and a lower case 33 (in other words, the case 30 of the electric power converter 10 includes an upper case 32 and a lower case 33). The inverter circuit is accommodated in the upper case 32 and the voltage converter circuit is accommodated in the lower case 33. Since the inverter circuit and the voltage converter circuit generate a large amount of heat, coolers that cool components of the respective circuits are accommodated in the case 30. A cooling medium supply port 29, to which a cooling medium supply hose is connected, is provided in the central portion of a front surface of the lower case 33 (in the present specification, "central portion of a front surface" may mean "substantially central portion of a front surface"). A cooling medium is supplied through the cooling medium supply hose. The cooling medium supplied via the cooling medium supply port 29 passes through the cooler in the lower ease 33 and cools the components of the voltage converter circuit. A resin water path 34 that connects the cooler in the lower case 33 and the cooler in the upper case 32 is connected to a front surface of the case 30. The cooling medium passing through the cooler in the lower case 33 is guided to the cooler in the upper case 32 through the resin water path 34. The cooling medium guided to the cooler in the upper case 32 cools the components of the inverter circuit. A cooling medium discharge port 36, to which a cooling medium discharge hose is connected, is provided in the central portion of a front surface of the upper case 32. The cooling medium is discharged through the cooling medium discharge horse. The cooling medium passing through the cooler in the upper case 32 is discharged via the cooling medium discharge port 36. Note that, in FIG. 2, the cooling medium supply hose connected to the cooling medium supply port 29 and the cooling medium discharge hose connected to the cooling medium discharge port 36 are not shown.

As described above, the electric power converter 10 is fixed onto the transaxle 91 with the use of the front bracket 35 and the rear bracket 95 (refer to FIG. 1). As illustrated in FIG. 2, the front bracket 35 is connected to the front surface of the lower case 33.

Various devices or pipes are disposed in the vicinity of the electric power converter 10. An air cleaner hose 21 extends in a vehicle width direction at a position ahead of and slightly above the electric power converter 10. An EGR hose 24 is located on the left side as seen in a direction from the front side to the electric power converter 10, and the FOR hose 24 extends in the vehicle front-rear direction. EGR is the abbreviation for exhaust gas recirculation. A cooling hose 27 and a heater hose 28 are routed below the EGR hose 24. The expression "as seen in, a direction from the front side to the electric power converter 10" means "as seen in a direction from the vehicle front side".

Both of the lower case 33 and the upper case 32 are formed of conductive metal. In some cases, a metal case of the electric device (electric power converter 10) is used as the ground of an internal circuit. Therefore, an earth terminal is connected to the case 30.

A first earth terminal 26 is connected to the front surface of the lower case 33 and a second earth terminal 25 is connected to the front surface of the upper case 32. The first earth terminal 26 is attached to a distal end of a first earth cable 23 and the second earth terminal 25 is attached to a distal end of a second earth cable 22. The first earth cable 23 and the second earth cable 22 extend from a cable cover 31 located at a position corresponding to the right side of the upper case 32 as seen in the direction from the front side to the electric power converter 10. The first earth cable 23 and the second earth cable 22 are routed such that the first earth cable 23 and the second earth cable 22 are located ahead of the upper case 32 to extend from a right side to a left side, and are curved at 90 degrees on the left side to extend toward the lower case 33 (in the present specification, "90 degrees" may mean "approximately 90 degrees") as seen in the direction from the front side to the electric power converter 10. In other words, the first earth cable 23 and the second earth cable 22 are routed from the upper case 32-side toward the lower case 33-side. The first earth terminal 26 is mounted onto the lower ease 33 and the second earth terminal 25 is mounted onto the upper case 32. In an area from the cable cover 31 to the connection positions of the earth terminals, the first earth cable 23 and the second earth cable 22 are routed to be parallel to each other without intersecting with each other (in the present specification, "being parallel to each other" may mean "being substantially parallel to each other").

The upper case 32 and the lower case 33 are mounted onto each other with an, insulating gasket interposed therebetween. Therefore, when the first earth terminal 26 is mounted onto the lower case 33 and the second earth terminal 25 is mounted onto the upper case 32, both of the lower case 33 and the upper case 32 are reliably held at the same around potential.

In FIG. 2, each of hatched regions, indicated by a symbol "A" is a position where a gap is narrow. The front bracket 35, the resin water path 34, the cooling medium supply hose (not shown), and the cooling medium discharge hose (not shown) are connected to the front surface of the case 30. The air cleaner hose 21 extends in the vehicle width direction at the position ahead of and above the case 30. The FOR hose 24 is positioned on the left side of the case 30. Therefore, to route the first earth cable 23 and the second earth cable 22 such that the first earth cable 23 and the second earth cable 22 are respectively connected to the lower case 33 and the upper case 32, it is desirable to route the first earth cable 23 and the second earth cable 22 as illustrated in FIG. 2.

Figure 3:
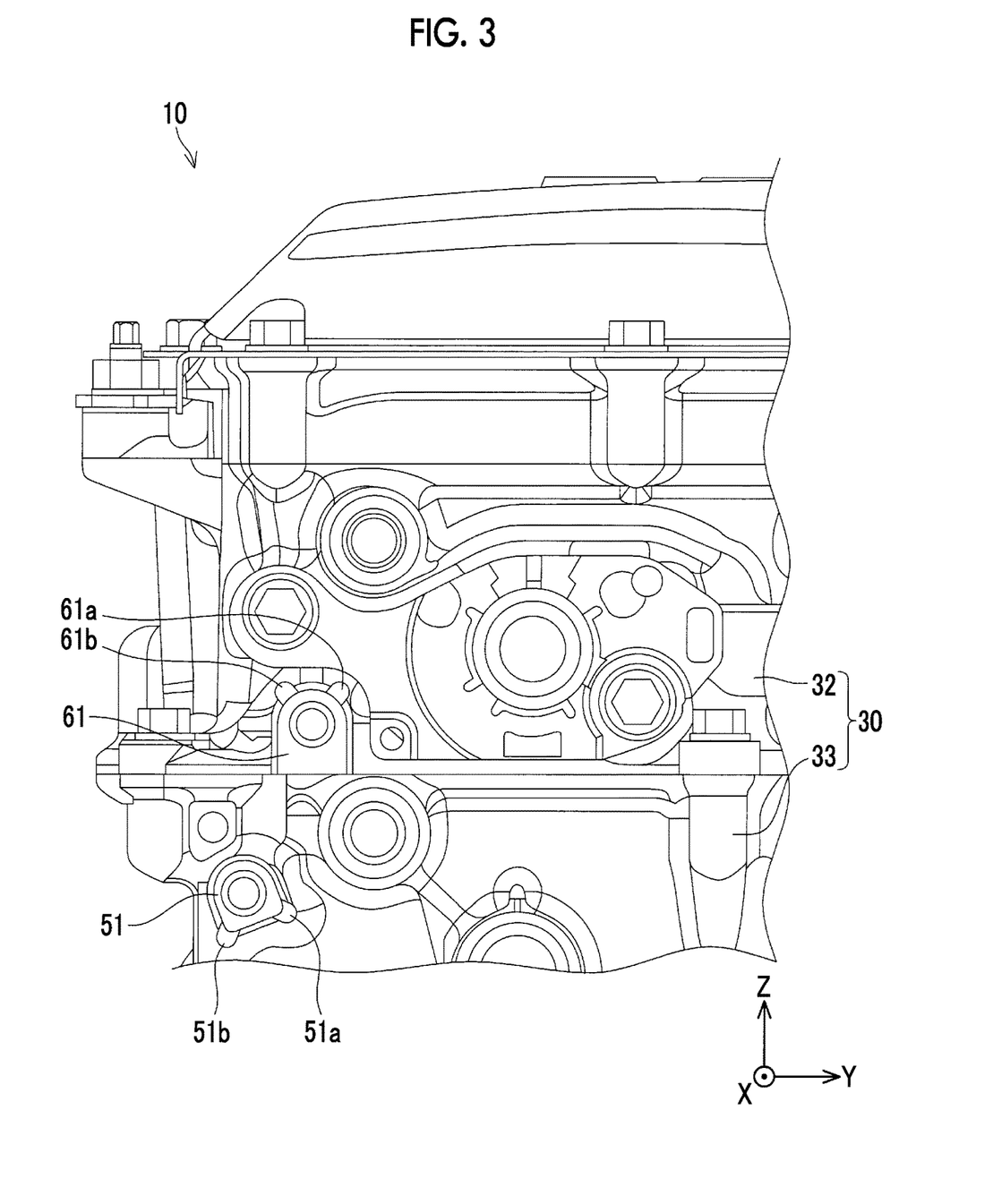
FIG. 3 is an enlarged view of earth terminal mounting positions (before earth terminals are connected to a case) and the vicinity thereof.
Figure 4:
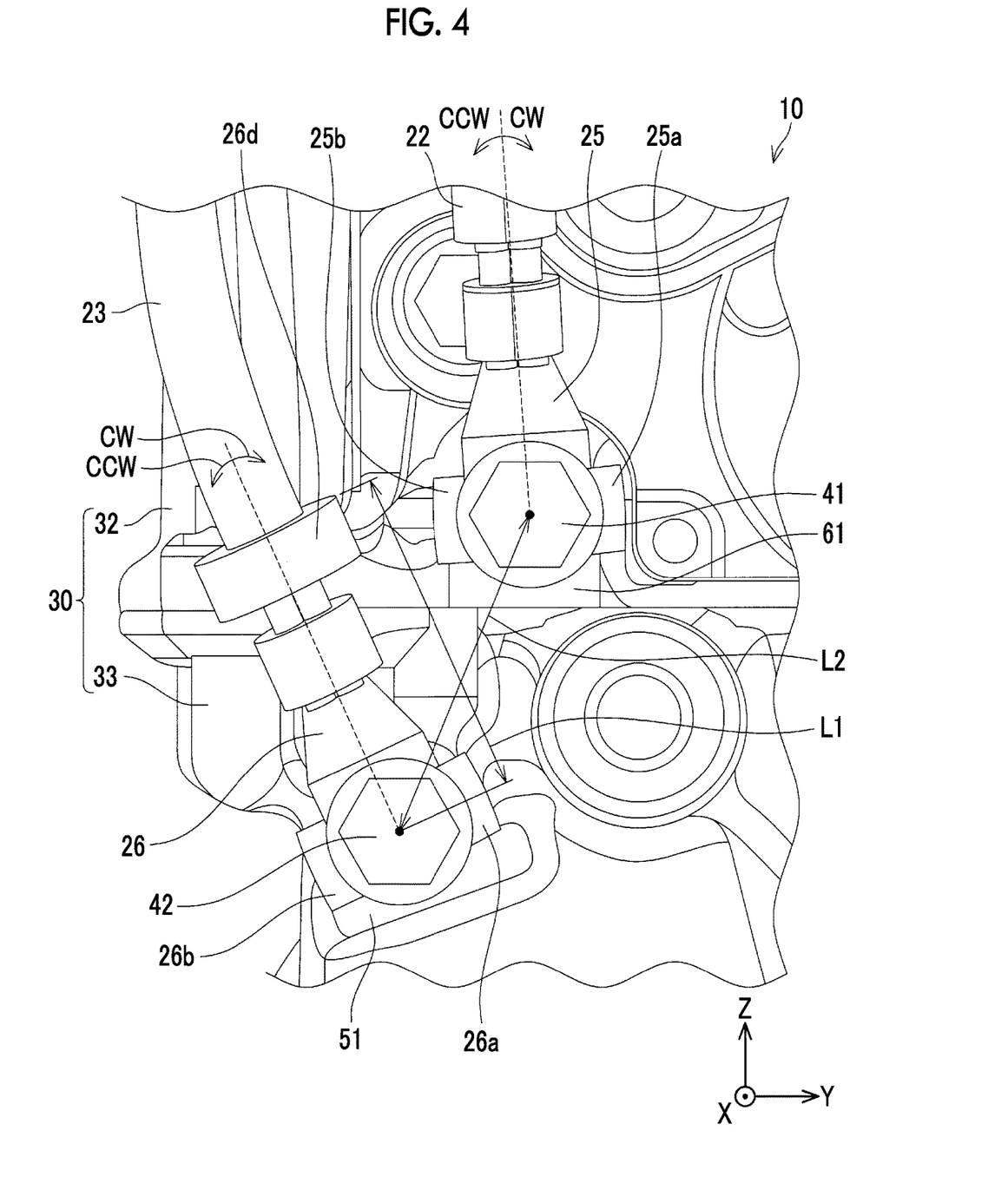
FIG. 4 is an enlarged view of the earth terminal mounting positions and the vicinity thereof.

FIG. 3 is an enlarged view of earth terminal mounting positions (i.e., positions on which the first earth terminal 26 and the second earth terminal 25 are to be mounted) and the vicinity thereof before the first earth terminal 26 and the second earth terminal 25 are connected to the case 30. FIG. 4 is an, enlarged view of mounting positions for the first earth terminal 26 and the second earth terminal 25 (i.e., positions on which the first earth terminal 26 and the second earth terminal 25 are mounted) and the vicinity thereof. The first earth terminal 26 and the second earth terminal 25 are respectively fixed to bosses (protrusions) provided on the cases. The front surface of the lower case 33 is provided with a first boss 51 that protrudes forward and the front surface of the upper ease 32 is provided with a second boss 61 that protrudes forward. The first earth terminal 26 is fixed to the first boss 51 and the second earth terminal 25 is fixed to the second boss 61. In the lower case 33, the first boss 51 is provided at a position, adjacent to the upper case 32. The second boss 61 is provided at a position adjacent to the first boss 51.

A screw hole for fixation of a bolt is provided in a distal end surface of each of the first boss 51 and the second boss 61. Each of the first earth terminal 26 and the second earth terminal 25 is provided with a through-hole into which a bolt is inserted. The first earth terminal 26 is fixed to the distal end surface of the first boss 51 via a bolt 42. The second earth terminal 25 is fixed to the distal end surface of the second boss 61 via a bolt 41.

As described above, the first earth cable 23 and the second earth cable 22 are routed in a narrow gap in the front compartment in which various devices or hoses are disposed. The angle of each of the first earth terminal 26 and the second earth terminal 25 about a bolt axis is restricted such that the first earth cable 23 and the second earth cable 22 do not interfere with devices or hoses in the vicinity of the first earth cable 23 and the second earth cable 22. In particular, as illustrated in FIG. 4, a length L1 of the first earth terminal 26 is larger than a distance L2 between the first boss 51 and the second boss 61, and a base portion 26d of the first earth terminal 26 is adjacent to a distal end of the second earth terminal 25. When the first earth terminal 26 rotates, the first earth terminal 26 may interfere with the second earth terminal 25. Therefore, rotation of each of the first earth terminal 26 and the second earth terminal 25 in a clockwise direction (direction represented by symbol "CW" in FIG. 4) and in a counter-clockwise direction (direction represented by symbol "CCW" in FIG. 4) around the bolt axis is restricted within an allowance range with a predetermined angle.

The rotation of the first earth terminal 26 is restricted by a first terminal-side stopper 26a and a second terminal side stopper 26b provided on the first earth terminal 26 and a first boss-side stopper 51a and a second boss-side stopper 51b provided on the first boss 51. The rotation of the second earth terminal 25 is restricted by a first terminal-side stopper 25a and a second terminal-side stopper 25b provided on the second earth terminal 25 and a first boss-side stopper 61a and a second boss-side stopper 61b provided on the second boss 61. Since a rotation stopping structure for the first earth terminal 26 and a rotation stopping structure for the second earth terminal 25 are the same, the rotation stopping structure for the first earth terminal 26 will be described below.

Figure 5:
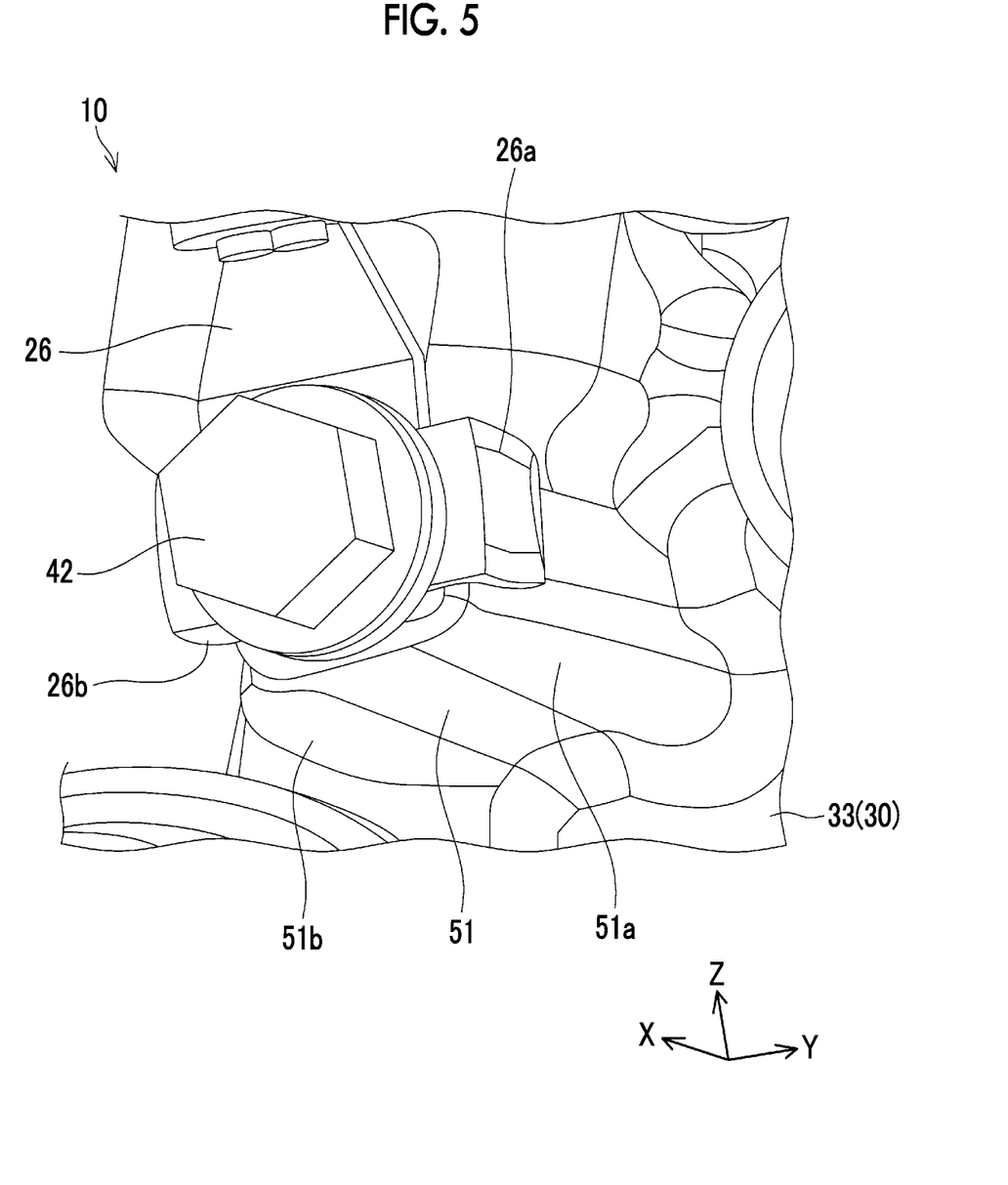
FIG. 5 is a view of a first earth terminal fixed to a first boss as seen in an oblique direction.

FIG. 5 is a view of the first earth terminal 26 mounted onto the first boss 51 as seen from an obliquely front side. The first terminal-side stopper 26a and the second terminal-side stopper 26b are beams that extend along a side surface of the first boss 51 from the first earth terminal 26 fixed to the first boss 51. The first boss-side stopper 51a and the second boss-side stopper 51b are rib-shaped protrusions that are provided on the side surface of the first boss-side that protrudes in an X direction in FIG. 5. The first boss-side stopper 51a and the second boss-side stopper 51b extend in a direction in which the first boss 51 protrudes (X direction in FIG. 5).

Figure 6:
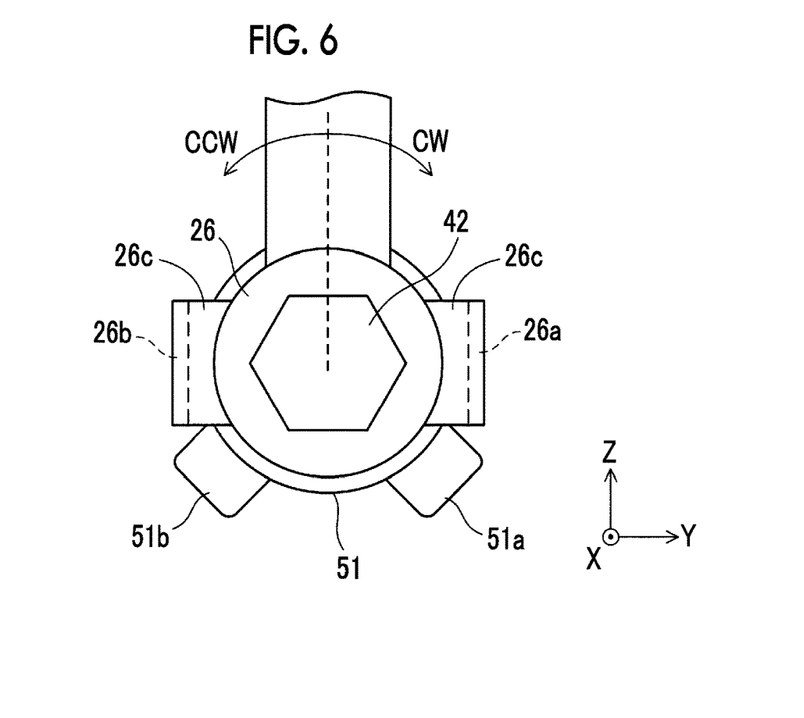
FIG. 6 is a front view of the first boss and the first earth terminal as seen in a direction in which the first boss extends.
Figure 7:
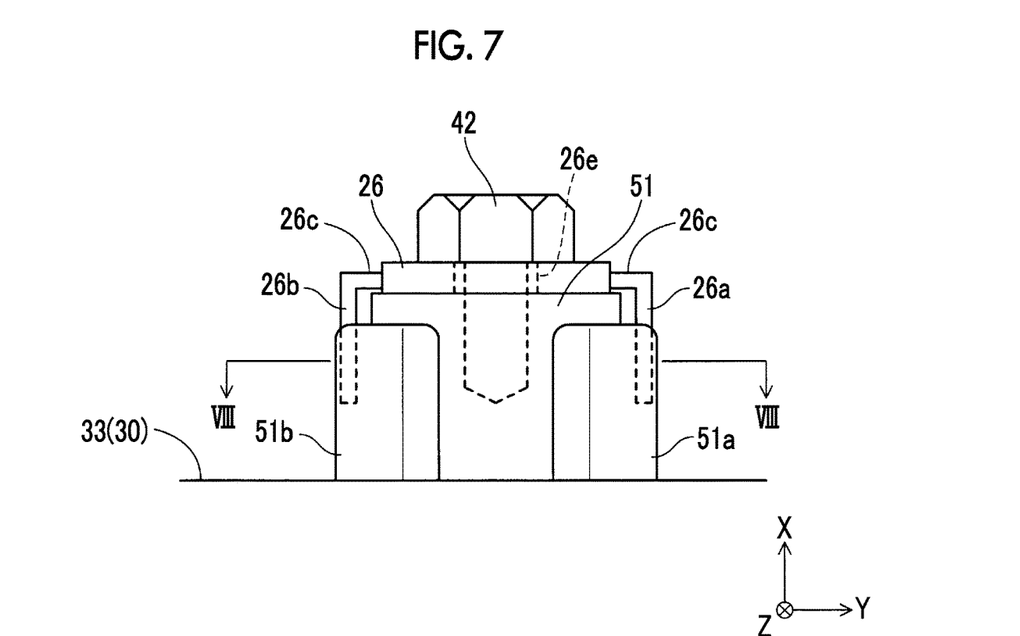
FIG. 7 is a side view of the first boss and the first earth terminal.
Figure 8:
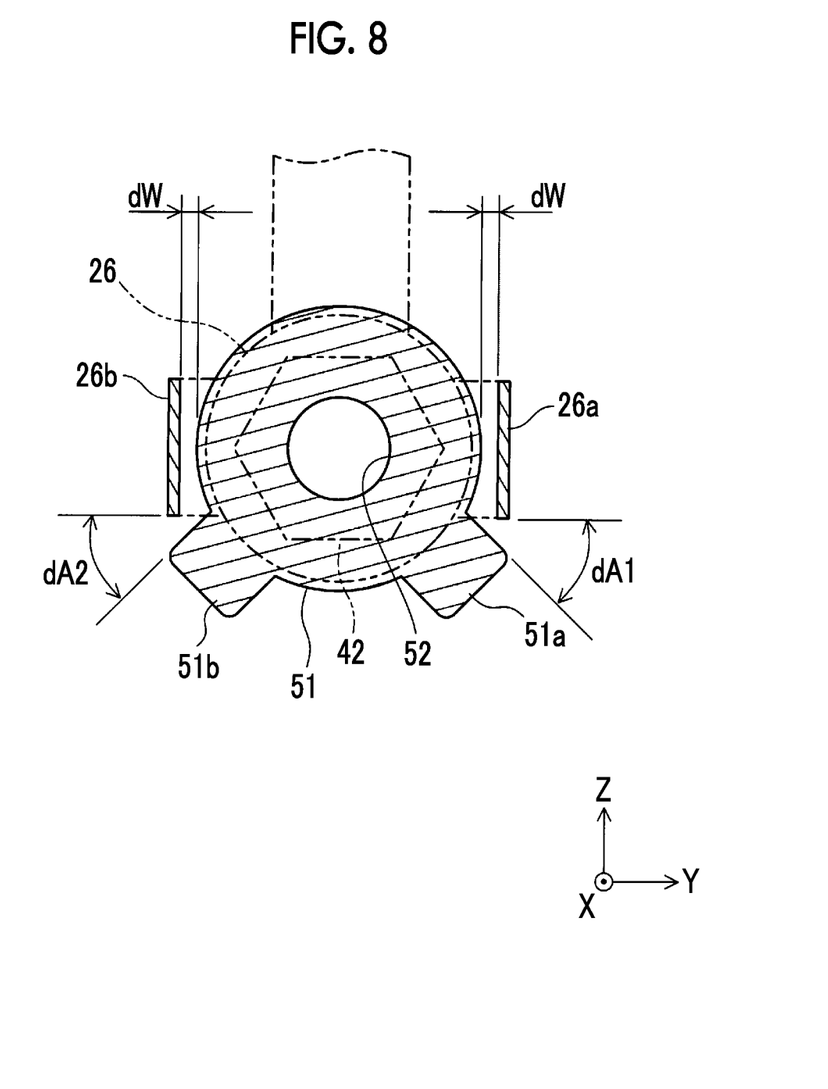
FIG. 8 is a sectional view taken along line VIII-VIII in FIG. 7.

A structure in which the first earth terminal 26 is mounted onto the first boss 51 will be described in more detail with reference to FIGS. 6 to 8. FIG. 6 is a front view of the first boss 51 and the first earth terminal 26 as seen in a direction in which the first boss protrudes (X direction). FIG. 7 is a side view of the first boss 51 and the first earth terminal 26. FIG. 8 is a sectional view taken along line VIII-VIII in FIG. 7. In FIG. 8, the bolt 42 and the first earth terminal 26 are illustrated by imaginary lines. In FIGS. 6 to 8, the shapes of the first earth terminal 26 and the first boss 51 are partially simplified in order to facilitate understanding, with the structural features thereof not omitted.

The first boss 51 is a protrusion that protrudes forward (X direction in FIG. 6) from the front surface of the lower case 33. The rib-shaped first boss-side stopper 51a and the rib-shaped second boss-side stopper 51b are provided on the side surface of the protrusion-shaped first boss 51. A through-hole 26e is provided in the central portion of the first earth terminal 26. The first earth terminal 26 is fixed to the distal end surface of the first boss 51 with the bolt 42 inserted into the through-hole 26e. A bolt hole 52 that is open in the distal end surface is provided in the central portion of the first boss 51 (refer to FIG. 8).

The first earth terminal 26 has a circular plate shape, and the outer shape of the first earth terminal 26 is smaller than the outer shape of the first boss 51 as seen in an axial direction of the bolt 42. Two arms 26c extend outward in a radial direction with respect to the bolt axis from an edge of the first earth terminal 26. The first terminal-side stopper 26a and the second terminal-side stopper 26b extend from the arms 26c along the side surface of the first boss 51. The first terminal-side stopper 26a faces the first boss-side stopper 51a in a circumferential direction of the first boss 51. When the first terminal-side stopper 26a comes into contact with the first boss-side stopper 51a, the rotation of the first earth terminal 26 in the clockwise direction (direction represented by symbol "CW" in FIG. 6) is restricted. The second terminal-side stopper 26b faces the second boss-side stopper 51b in the circumferential direction of the first boss 51. When the second terminal-side stopper 26b comes into contact with the second boss-side stopper 51b, the rotation of the first earth terminal 26 in the counter-clockwise direction (direction represented by symbol "CCW" in FIG. 6) is restricted.

As illustrated in FIG. 8, a gap dW is secured between the first terminal-side stopper 26a and the side surface of the first boss 51 and the gap dW is also secured between the second terminal-side stopper 26b and the side surface of the first boss 51. In addition, a gap with an angle dA1 is secured between the first terminal-side stopper 26a and the first boss-side stopper 51a in the circumferential direction of the first boss 51 and a gap with an angle dA2 is secured between the second terminal-side stopper 26b and the second boss-side stopper 51b in the circumferential direction of the first boss 51. The sum of the angle dA1 and the angle dA2 is, for example, 20 degrees and the sum of the angles corresponds to an allowance angle for the first earth terminal 26. Since the gaps dW and the gap angles dA1+da2 are provided, an operation of mounting the first earth terminal 26 to the first boss 51 is easily performed.

A structural relationship between the second earth terminal 25 and the second boss 61 is the same as the structural relationship between the first earth terminal 26 and the first boss 51, and therefore, description thereof will be omitted.

Figure 9:
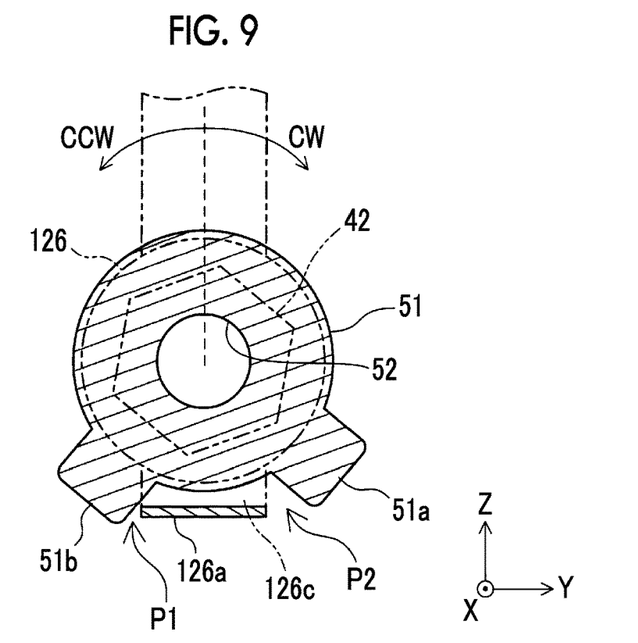
FIG. 9 is a sectional view illustrating a mounting structure of a first modification example.

Next, a rotation stopping structure (mounting structure) of a first modification example will be described with reference to FIG. 9. The rotation stopping structure for an earth terminal includes a terminal-side stopper and a boss-side stopper FIG. 9 is a sectional view of the first boss 51 and an earth terminal 126 fixed to the first boss 51. The earth terminal 126 and the bolt 42 are illustrated with imaginary lines. In the case of the rotation stopping structure (mounting structure) of the first modification example, the first boss 51 is the same as that of the embodiment and the rib-shaped first boss-side stopper 51a and the rib-shaped second boss-side stopper 51b are provided on the side surface of the first boss 51. The earth terminal 126 is provided with one terminal-side stopper 126a. The terminal-side stopper 126a extends along the side surface of the first boss 51 from an arm 126e that extends from an edge of the earth terminal 126. The terminal-side stopper 126a is positioned between the first boss-side stopper 51a and the second boss-side stopper 51b. One end of the terminal-side stopper 126a faces the first boss-side stopper 51a in the circumferential direction of the first boss 51 and the other end of the terminal-side stopper 126a faces the second boss-side stopper 51b in the circumferential direction of the first boss 51.

The terminal-side stopper 126a and the first and second boss-side stoppers 51a, 51b restrict the rotation of the earth terminal 126 in the clockwise direction (direction represented by symbol "CW" in FIG. 9) and in the counter-clockwise direction (direction represented by symbol "CCW" in FIG. 9). FIG. 9 illustrates a state where the rotation of the earth terminal 126 in the clockwise direction is restricted and the terminal-side stopper 126a and the second boss-side stopper 51b contact each other in the circumferential direction (refer to a position represented by symbol "P1" in FIG. 9). At this time, a gap is secured between the terminal-side stopper 126a and the first boss-side stopper 51a (refer to a position represented by symbol "P2" in FIG. 9). The gap between the terminal-side stopper 126a and the first boss-side stopper 51a corresponds to a rotation range within which the earth terminal 126 is allowed to rotate.

Figure 10:
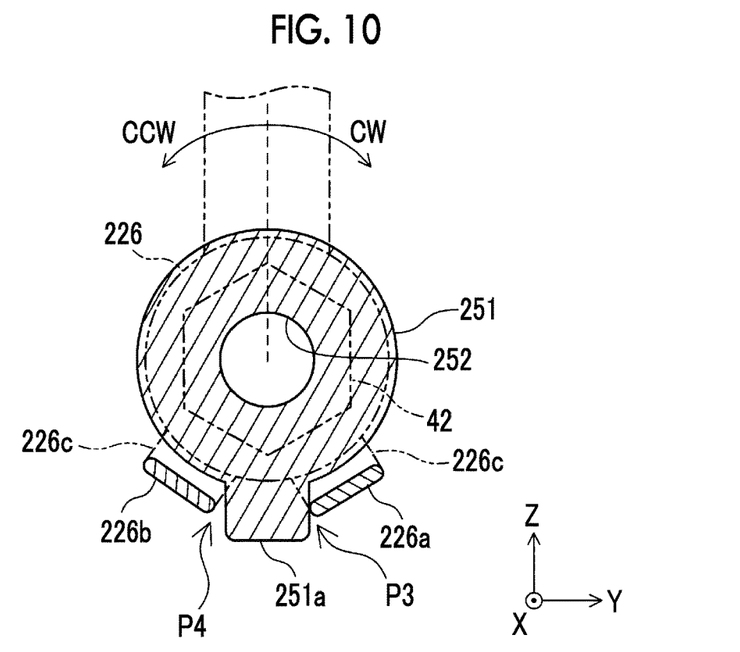
FIG. 10 is a sectional view illustrating a mounting structure of a second modification example.

Next, a rotation stopping structure (mounting structure) of a second modification example will be described with reference to FIG. 10. FIG. 10 is a sectional view of a boss 251 and an, earth terminal 226 fixed to the boss 251. The earth terminal 226 and the bolt 42 in FIG. 10 are also illustrated with imaginary lines. In the case of the rotation stopping structure of the second modification example, the boss 251 is provided with one boss-side stopper 251a and the earth terminal 226 is provided with two terminal-side stoppers (first terminal-side stopper 226a and second terminal-side stopper 226b). Note that, a symbol "252" in FIG. 10 represents a screw hole that is open in a distal end surface of the boss 251.

The boss-side stopper 251a is a rib-shaped protrusion provided on a side surface of the boss 251 and the boss-side stopper 251a extends in a direction in which the boss 251 protrudes (X direction in FIG. 10). The first terminal-side stopper 226a and the second terminal-side stopper 226b are beams that extend along a side surface of the boss 251 from distal ends of arms 226c extending from an edge of the earth terminal 226. The first terminal-side stopper 226a and the second terminal-side stopper 226b are positioned such that the boss-side stopper 251a is interposed therebetween. The first terminal-side stopper 226a faces one side surface of the boss-side stopper 251a in a circumferential direction of the boss 251 and the second terminal-side stopper 226b faces the other side surface of the boss-side stopper 251a in the circumferential direction of the boss 251.

In FIG. 10, the rotation of the earth terminal 226 in the clockwise direction (direction represented by symbol "CW" in FIG. 10) is restricted, and the boss-side stopper 251a and the first terminal-side stopper 226a are in contact with each other in the circumferential direction (refer to a position represented by symbol "P3" in FIG. 10). At this time, a gap is secured between the boss-side stopper 251a and the second terminal-side stopper 226b (refer to a position represented by symbol "P4" in FIG. 10). The gap between the boss-side stopper 251a and the second terminal-side stopper 226h corresponds to a rotation range within which the earth terminal 226 is allowed to rotate.

Figure 11:
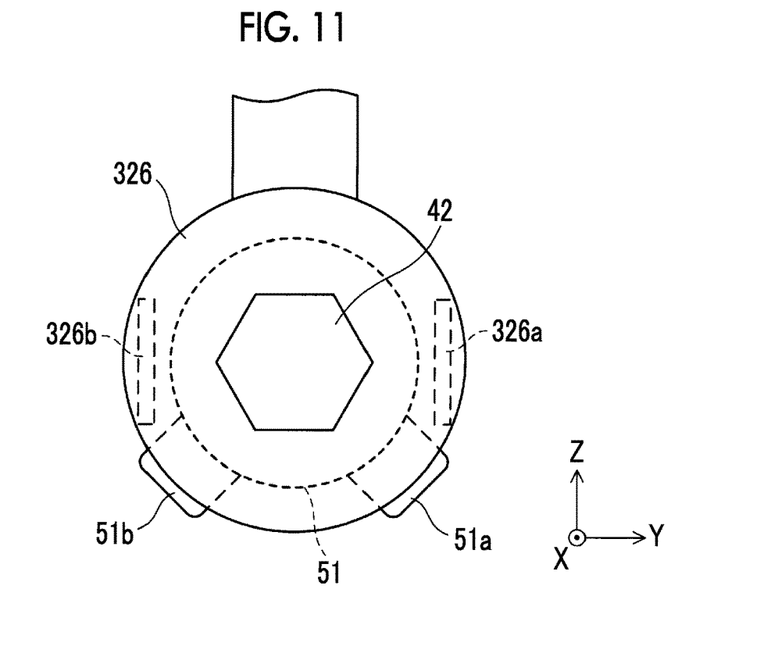
FIG. 11 is a front view illustrating a modification example of the earth terminal.
Figure 12:
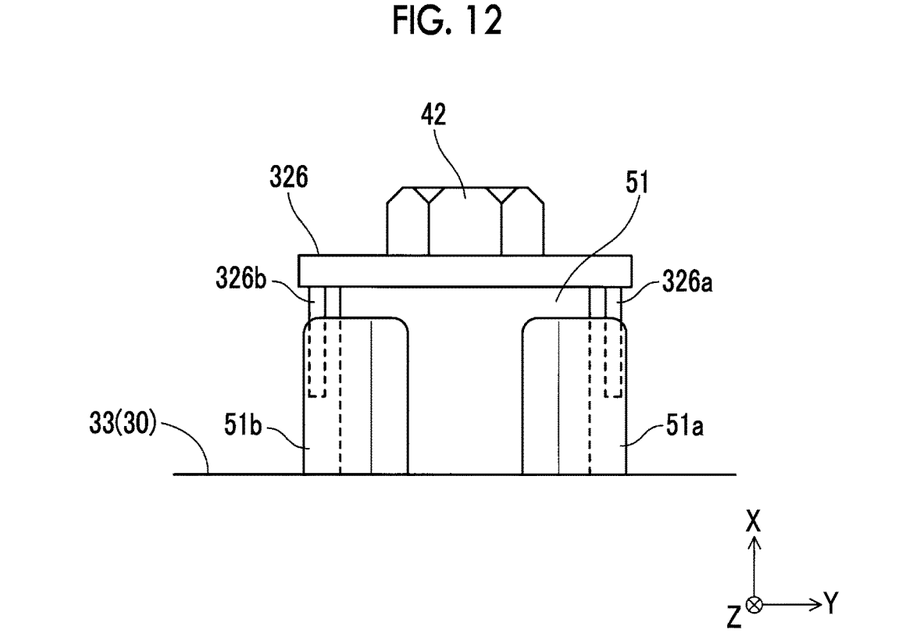
FIG. 12 is a side view illustrating the modification example of the earth terminal.

An earth terminal 326 of a modification example will be described with reference to FIGS. 11 and 12. FIG. 11 is a front view of the earth terminal 326 fixed to the first boss 51 in the embodiment and FIG. 12 is a side view of the earth terminal 326 fixed to the first boss 51 in the embodiment. The diameter of the first earth terminal 26 in the embodiment is smaller than the outer shape of the first boss 51 as seen in the axial direction of the bolt. The arms 26c extend from the edge of the first earth terminal 26 and the first terminal-side stopper 26a and the second terminal-side stopper 26b extend along the side surface of the first boss 51 from the distal ends of the arms 26c. The diameter of the earth terminal 326 in the modification example is larger than the outer shape of the first boss 51, and a first terminal-side stopper 326a and a second terminal-side stopper 326b directly extend from an edge of the earth terminal 326. A configuration as illustrated in FIGS. 11 and 12 may also be adopted.

Some of features of a technique described in the embodiment will be summarized below. The present disclosure provides an earth terminal mounting structure in which an earth terminal is mounted onto a case of an electric device. The earth terminal mounting structure includes the boss (first boss 51) protruding from the conductive case 30 and the earth terminal (first earth terminal 26) fixed to a distal end surface of the first boss 51. The first earth terminal 26 is provided with the terminal-side stoppers (first terminal-side stopper 26a and second terminal-side stopper 26b) that extend along the side surface of the first boss 51. The protrusion-shaped first boss-side stopper 51a that faces the first terminal-side stopper 26a in the circumferential direction of the first boss 51 is provided on the side surface of the first boss 51. The protrusion-shaped second boss-side stopper 51b that faces the second terminal-side stopper 26b is provided on the side surface of the first boss 51. The first terminal-side stopper 26a, the second terminal-side stopper 26b, the first boss-side stopper 51a, and the second boss-side stopper 51b restrict the rotation of the first earth terminal 26 in the clockwise direction and in the counter-clockwise direction.

Points to be noted with regard to the technology described in the embodiment will be described. The earth terminal mounting structure disclosed in the present specification may be applied to electronic devices other than an electric power converter.

The lower case 33 is an example of a first partial case and the upper case 32 is an example of a second partial case.

While specific examples of the disclosure have been described above in, detail, these examples are merely illustrative and do not limit the scope of the disclosure. The disclosure includes various changes and modifications made to the specific examples described above. The technical elements in the disclosure demonstrate technical utility when used singly or in various combinations, and thus the combinations of the technical elements are not limited to the combinations described in the disclosure.

What is claimed is:

1. An earth terminal mounting structure comprising:
a boss protruding from a conductive case, wherein the boss includes a hole provided in a distal end surface of the boss; and
an earth terminal fixed to the distal end surface of the boss, wherein:
the earth terminal is provided with a terminal-side stopper that extends along a side surface of the boss;
a boss-side stopper having a protrusion shape is provided on the side surface of the boss, the boss-side stopper facing the terminal-side stopper in a circumferential direction of the boss; and
the terminal-side stopper and the boss-side stopper restrict rotation of the earth terminal in a clockwise direction and in a counter-clockwise direction.

2. The earth terminal mounting structure according to claim 1, wherein:
the earth terminal is provided with a first terminal-side stopper and a second terminal-side stopper;
a first boss-side stopper that faces the first terminal-side stopper in the circumferential direction of the boss and a second boss-side stopper that faces the second terminal-side stopper in the circumferential direction of the boss are provided on the side surface of the boss;
the first terminal-side stopper and the first boss-side stopper restrict the rotation of the earth terminal in the clockwise direction; and
the second terminal-side stopper and the second boss-side stopper restrict the rotation of the earth terminal in the counter-clockwise direction.

3. The earth terminal mounting structure according to claim 2, wherein at least one of a gap between the first terminal-side stopper and the boss and a gap between the second terminal-side stopper and the boss is secured.

4. The earth terminal mounting structure according to claim 2, wherein at least one of a gap between the first terminal-side stopper and the first boss-side stopper and a gap between the second terminal-side stopper and the second boss-side stopper is secured in the circumferential direction of the boss.

5. The mounting structure according to claim 1, wherein:
the case includes a first partial case and a second partial case;
in the first partial case, a first boss is provided at a position adjacent to the second partial case;
a first earth terminal is fixed to a distal end surface of the first boss;
in the second partial case, a second boss is provided at a position adjacent to the first boss;
a second earth terminal is fixed to a distal end surface of the second boss;
the terminal-side stopper is provided on each of the first earth terminal and the second earth terminal;
the boss-side stopper is provided on a side surface of each of the first boss and the second boss;
a distance between the first boss and the second boss is shorter than a length of the first earth terminal;
a first cable connected to the first earth terminal and a second cable connected to the second earth terminal are routed from a second partial case-side to a first partial case-side; and
the first cable and the second cable do not intersect with each other.

6. An earth terminal mounting structure comprising:
a first boss and a second boss protruding from a conductive case, wherein:
the conductive case includes a first partial case and a second partial case,
the first partial case includes the first boss provided at a position adjacent to the second partial case, and
the second partial case includes the second boss provided at a position adjacent to the first partial case;
a first earth terminal fixed to a distal end surface of the first boss, wherein the first earth terminal is provided with a terminal-side stopper that extends along a side surface of the first boss; and
a second earth terminal fixed to a distal end surface of the second boss, wherein the second earth terminal is provided with a terminal-side stopper that extends along a side of the second boss; and
a boss-side stopper provided on a side surface of each of the first boss and the second boss, wherein:
the boss-side stopper of the first boss faces the terminal-side stopper of the first earth terminal in a circumferential direction of the first boss, and the boss-side stopper of the second boss faces the terminal-side stopper of the second earth terminal in a circumferential direction of the second boss;

wherein:

the terminal-side stopper of the first earth terminal and the boss-side stopper of the first boss restrict rotation of the first earth terminal in a clockwise direction and in an counter-clockwise direction;

the terminal-side stopper of the second earth terminal and the boss-side stopper of the second boss restrict rotation of the second earth terminal in a clockwise direction and in an counter-clockwise direction;

a distance between the first boss and the second boss is shorter than a length of the first earth terminal;

a first cable connected to the first earth terminal and a second cable connected to the second earth terminal are routed from a second partial case-side to a first partial case-side; and the first cable and the second cable do not intersect with each other.

7. The earth terminal mounting structure according to claim 6, wherein:

the terminal-side stopper of the first earth terminal includes a first terminal-side stopper element and a second terminal-side stopper element;

the boss-side stopper of the first boss includes a first boss-side stopper element and a second boss-side stopper element;

the first boss-side stopper element of the first boss faces the first terminal-side stopper element in the circumferential direction of the first boss and a second boss-side stopper element faces the second terminal-side stopper element in the circumferential direction of the boss are provided on the side surface of the boss;

the first terminal-side stopper element and the first boss-side stopper element restrict the rotation of the first earth terminal in the clockwise direction; and the second terminal-side stopper element and the second boss-side stopper element restrict the rotation of the first earth terminal in the counter-clockwise direction.

8. The earth terminal mounting structure according to claim 7, wherein at least one of a gap between the first terminal-side stopper and the first boss or a gap between the second terminal-side stopper element and the first boss is secured.

9. The earth terminal mounting structure according to claim 7, wherein at least one of a gap between the first terminal-side stopper element and the first boss-side stopper element or a gap between the second terminal-side stopper element and the second boss-side stopper element is secured in the circumferential direction of the first boss.

* * * * *

UNITED STATES PATENT AND TRADEMARK OFFICE
CERTIFICATE OF CORRECTION

PATENT NO. : 10,658,768 B2
APPLICATION NO. : 16/257804
DATED : May 19, 2020
INVENTOR(S) : Kenji Umemura and Tatsuya Murata Page 1 of 2

It is certified that error appears in the above-identified patent and that said Letters Patent is hereby corrected as shown below:

On the Title Page

Item [72], delete "Toyota" and insert --Toyota-shi Aichi-ken--, therefor.

Item [72], delete "Nagoya" and insert --Nagoya-shi Aichi-ken--, therefor.

In the Specification

In Column 1, Line 17, delete "ease" and insert --case--, therefor.

In Column 4, Line 20, delete "ease" and insert --case--, therefor.

In Column 4, Line 32, delete "horse" and insert --hose--, therefor.

In Column 4, Line 49, delete "FOR" and insert --EGR--, therefor.

In Column 5, Line 14, delete "ease" and insert --case--, therefor.

In Column 5, Line 23, after "an", delete ",".

In Column 5, Line 29, after "regions", delete ",".

In Column 5, Line 35, delete "FOR" and insert --EGR--, therefor.

In Column 5, Line 47, after "an", delete ",".

In Column 5, Line 55, delete "ease" and insert --case--, therefor.

In Column 5, Line 59, after "position", delete ",".

Signed and Sealed this
Eleventh Day of August, 2020

Andrei Iancu
*Director of the United States Patent and Trademark Office*

CERTIFICATE OF CORRECTION (continued)
U.S. Pat. No. 10,658,768 B2

In Column 7, Line 51, after "stopper", insert --.--.

In Column 7, Line 61, delete "126e" and insert --126c--, therefor.

In Column 8, Line 23, after "an", delete ",".

In Column 8, Line 58, delete "226h" and insert --226b--, therefor.